United States Patent
D'Aleo et al.

(10) Patent No.: US 12,092,567 B2
(45) Date of Patent: Sep. 17, 2024

(54) OPTICAL DETECTION SYSTEM CALIBRATION

(71) Applicant: ams Sensors Singapore Pte. Ltd., Singapore (SG)

(72) Inventors: Francesco Paolo D'Aleo, Zurich (CH); Javier Miguel Sánchez, Zurich (CH); Kotaro Ishizaki, Zurich (CH); Peter Roentgen, Thalwil (CH)

(73) Assignee: AMS Sensors Singapore Pte. Ltd., Singapore (SG)

( * ) Notice: Subject to any disclaimer, the term of this patent is extended or adjusted under 35 U.S.C. 154(b) by 237 days.

(21) Appl. No.: 17/762,456

(22) PCT Filed: May 24, 2021

(86) PCT No.: PCT/SG2021/050281
§ 371 (c)(1),
(2) Date: Mar. 22, 2022

(87) PCT Pub. No.: WO2021/262088
PCT Pub. Date: Dec. 30, 2021

(65) Prior Publication Data
US 2022/0373454 A1    Nov. 24, 2022

(30) Foreign Application Priority Data

Jun. 24, 2020  (GB) ..................... 2009640

(51) Int. Cl.
*G01N 21/27*     (2006.01)
*G01N 21/55*     (2014.01)

(52) U.S. Cl.
CPC ........... *G01N 21/274* (2013.01); *G01N 21/55* (2013.01); *G01N 2201/127* (2013.01)

(58) Field of Classification Search
CPC ................. G01N 21/274; G01N 21/55; G01N 2201/127; G01J 2003/425; G01J 3/0256;
(Continued)

(56) References Cited

U.S. PATENT DOCUMENTS

2003/0169420 A1   9/2003  Ruiz
2006/0115046 A1   6/2006  Berman et al.
(Continued)

FOREIGN PATENT DOCUMENTS

| JP | 2001-141644 A | 5/2001 |
| JP | 2001141644 A * | 5/2001 |
| WO | 2019-211485 A1 | 11/2019 |

OTHER PUBLICATIONS

JP 2001141644 A Translation (Year: 2001).*
(Continued)

*Primary Examiner* — Tarifur R Chowdhury
*Assistant Examiner* — Carlos Perez-Guzman
(74) *Attorney, Agent, or Firm* — Viering, Jentschura & Partner mbB; Samuel Y. Lo

(57) ABSTRACT

According to a first aspect of the present invention there is provided a method of measuring the optical reflectance R of a target using a detection system comprising a light emitter and a light detector spaced apart from one another. The method comprises illuminating the target with the light emitter, detecting light reflected from the target using the light detector, wherein the light detector provides an electrical output signal $S_S$ indicative of the intensity of the detected light, and determining the optical reflectance R of the target according to (Formula 1), where $R_R$ is the spectral reflectance of a reference standard, $S_R$ is the detector electrical output signal with the reference standard in place, $S_H$ is the detector electrical output signal with no target in front of the light emitter and light detector, and M is a calibration factor.

(Continued)

$$R = M \cdot R_R \frac{s_s - s_H}{M \cdot \lceil s_R - s_H \rceil - R_R \lceil s_R - s_s \rceil}, \qquad (I)$$

15 Claims, 7 Drawing Sheets

(58) Field of Classification Search
CPC .. G01J 3/0278; G01J 3/28; G01J 3/42; G01M 11/02
See application file for complete search history.

(56) References Cited

U.S. PATENT DOCUMENTS

| | | | |
|---|---|---|---|
| 2007/0215801 A1* | 9/2007 | Walsh | G01N 21/278 250/252.1 |
| 2008/0297791 A1* | 12/2008 | Imura | G01J 3/28 356/306 |
| 2013/0169968 A1 | 7/2013 | Ohtsuka et al. | |
| 2017/0191821 A1 | 7/2017 | Deck | |
| 2018/0180535 A1* | 6/2018 | Sorgato | G01N 21/4795 |
| 2019/0187337 A1* | 6/2019 | Yang | H01L 21/0337 |
| 2020/0056939 A1 | 2/2020 | Ishizaki et al. | |

OTHER PUBLICATIONS

International Preliminary Report on Patentability for Application No. PCT/SG2021/050281 dated Dec. 13, 2022 (7 pages).
International Search Report for corresponding International Application No. PCT/SG2021/050281, dated Aug. 27, 2021.
Search Report for corresponding GB2009640.0 dated Mar. 15, 2021 (GB).

* cited by examiner

OPTICAL DETECTION SYSTEM CALIBRATION

TECHNICAL FIELD

The present invention relates to the calibration of those optical detection systems which are composed by a non-directional light source, a detector and a target (material under test) and, more particularly, to such systems configured to measure optical reflectance of the target.

BACKGROUND

Numerous systems are known for measuring the optical reflectance of a target such as a piece of material, e.g. plastic, metal, etc. Some systems are able to determine reflectance across a range of wavelengths. Determining the reflectance of a target is desirable in a number of varied applications, including, for example, food analysis, colour sensing, infra-red sensing, biomedical sensors, spectral sensing, counterfeiting, make-up analysis, medicine analysis, process control, thickness measurement, high temperature thermometry, LED measurement, reactive analysis, and fluorescence analysis. Such a system will typically comprise a light emitter, a light detector (e.g. configured to scan across a range of wavelengths if a reflectance versus wavelength characteristic is required), and a chassis to which the emitter and detector are attached or housed within. In some cases the chassis may be a module that facilitates the installation of the system in some larger apparatus such that the system may be a standard component that is sold to manufacturers of different apparatus. In other cases, the chassis may be the apparatus itself, for example a smartphone within which the emitter and detector are integrated. In other cases, the chassis may be a combination of a module and the apparatus.

Current detection systems are likely to assume a linear relationship between target reflectance $R_S$ at a given wavelength $\lambda$ and an (electrical) output signal of the detector across a range of wavelengths of interest. This can be represented as follows:

$$R_S = \frac{S_S - S_H}{S_R - S_H} \cdot R_R \quad (1)$$

where:
- $R_R$ is the spectral reflectance of the reference standard;
- $S_R$ is the signal with the reference standard in place (e.g. a target with a reflectance of say 99%);
- $S_S$ is the signal with the calibration item in place;
- $S_H$ is the signal with an open port, i.e. no target in front of the emitter.

In many cases however, due to the multiple paths of light hitting the target and the chassis hosting the optical system before arriving at the detector, the amount of light intensity collected by the detector will not be linear with the reflectance of the target. This will be more apparent for high reflectance targets. In other words, the intensity collected by the detector includes not only the rays that hit the target and then the detector (direct path), but also the light rays reflected by the target and the chassis hosting the optical system (non-linear part). This is illustrated schematically in FIG. 1 which shows the target 1 and an optical reflection detection system 2 comprising an emitter 3, for example an LED (emitting generally white light), and a detector 4, for example a photodiode. The emitter and detector are housed within a chassis 5, which has openings directly above the emitter and detector to allow the passage of light to and from the target. The spacing between the upper surface of the chassis and the target is denoted by h, whilst the spacing between the emitter and detector is denoted by d. FIG. 1 illustrates a first ray 6 that leaves the emitter at an angle such that it hits the detector after a single reflection from the target, and a second ray 7 that hits the target after two reflections from the target and a single reflection from the top of the chassis.

It will of course be clear from FIG. 1 not all rays encountering multiple reflections between the chassis and the target will impinge on the detector. Therefore, approaches relying on the linear relationship of equation (1) lead to an overestimation of the measured intensity (emitter-target-detector) and a consequent underestimation of the calculated reflectance. Additionally, the calculated reflectance as well as the intensity collected are strongly dependent on the hosting chassis (e.g. surface reflectance, geometry).

In order to provide a fully characterized optical module (printed circuit board and optical components), this has to be paired to a specific housing. Furthermore, the processed spectra of reflectance are not only affected by a non-linear modulation of the amplitude, but also they differ from device to device having different or even the same chassis. Another issue with current systems is that the devices are likely calibrated only for a specific distance (h) from the target. This may be acceptable where h does not vary, e.g. where the chassis is a smartphone and the target is always pressed against the device screen, but will otherwise result in reduced flexibility.

SUMMARY

According to a first aspect of the present invention there is provided a method of measuring the optical reflectance R of a target using a detection system comprising a light emitter and a light detector spaced apart from one another. The method comprises illuminating the target with the light emitter, detecting light reflected from the target using the light detector, wherein the light detector provides an electrical output signal $S_S$ indicative of the intensity of the detected light, and determining the optical reflectance R of the target according to $$R = M \cdot R_R \frac{s_s - s_H}{M \cdot [s_R - s_H] - R_R[s_R - s_s]},$$

where $R_R$ is the spectral reflectance of a reference standard, $S_R$ is the detector electrical output signal with the reference standard in place, $S_H$ is the detector electrical output signal with no target in front of the light emitter and light detector, and M is a calibration factor.

The method may comprise determining a height z of the target above the detection system, using said height z to determine a height scaling factor $\eta(z)$, and scaling the determined reflectance using the scaling factor according to $$R = M \cdot R_R \frac{s_s - s_H}{M \cdot [s_R - s_H] - R_R[s_R - s_s]} \cdot \eta(z).$$

The reflectance R may be measured for one or more wavelengths λ, according to:

$$R(\lambda) = M(\lambda) \cdot R_R(\lambda) \frac{s_s(\lambda) - s_H(\lambda)}{M(\lambda) \cdot [s_R(\lambda) - s_H(\lambda)] - R_R(\lambda)[s_R(\lambda) - s_s(\lambda)]}$$

The electrical output signals may be integrated over a wavelength range, and said reflectances represent reflectances averaged over the wavelength range.

The step of determining the optical reflectance R of the target may comprise obtaining from a memory values for each of $R_R$, $S_R$, $S_H$ and M, and evaluating the equation $$R = M \cdot R_R \frac{s_s - s_H}{M \cdot [s_R - s_H] - R_R[s_R - s_s]}.$$

The step of determining the optical reflectance R of the target may comprise using said output signal $S_S$ as a look-up to a look-up table, the look-up table being populated with reflectance values evaluated using the equation $$R = M \cdot R_R \frac{s_s - s_H}{M \cdot [s_R - s_H] - R_R[s_R - s_s]}$$

and values for each of $R_R$, $S_R$, $S_H$ and M.

The calibration factor M may be dependent upon a target material type. A memory may contain a table mapping target types to respective values of M.

According to a second aspect of the present invention there is provided a method of obtaining calibration data for a detection system configured to use the method of any one of the preceding claims to measure optical reflectance. The method comprises operating a calibration detection system comprising a light emitter and a light detector spaced apart from one another, for a plurality of targets of known optical reflectances R and obtaining the respective electrical output signals of the detector $S_R$, and solving the following equation to determine a calibration factor M;

$$S_R = k \cdot I_0 \cdot \frac{R}{M} \frac{1}{1 - \frac{R}{M}}.$$

The calibration detection system may be the detection system for which calibration data is being obtained, or it may be a different system from the detection system for which calibration data is being obtained in which case the method comprises providing the calibration factor M to the detection system for which calibration data is being obtained.

The method may comprise performing the steps of operating and solving for one or more wavelengths, and determining a value of M(λ) for each wavelength.

The method may comprise repeating the steps of operating and solving, for a plurality of different heights z above the calibration detection system, to determine values of M and η(z) for respective heights.

According to a third aspect of the present invention there is provided an optical reflectance measurement system comprising a chassis and, mounted to the chassis, a light emitter and a light detector. The system further comprises a processor or processors configured to cause the light emitter to illuminate the target, cause the light detector to detect light reflected from the target, wherein the light detector provides an electrical output signal $S_S$ indicative of the intensity of the detected light, and determine the optical reflectance R of the target according to $$R = M \cdot R_R \frac{s_s - s_H}{M \cdot [s_R - s_H] - R_R[s_R - s_s]},$$

where $R_R$ is the spectral reflectance of a reference standard, $S_R$ is the detector electrical output signal with the reference standard in place, $S_H$ is the detector electrical output signal with no target in front of the light emitter and light detector, and M is a calibration factor.

The system may comprise a proximity sensor for determining a height z of the target above the detection system, said processor or processors configured to use said height z to determine a height scaling factor η(z), and scale the determined reflectance using the scaling factor according to $$R = M \cdot R_R \frac{s_s - s_H}{M \cdot [s_R - s_H] - R_R[s_R - s_s]} \cdot \eta(z).$$

The processor or processors may be configured to determine said reflectance R for one or more wavelengths λ, according to:

$$R(\lambda) = M(\lambda) \cdot R_R(\lambda) \frac{s_s(\lambda) - s_H(\lambda)}{M(\lambda) \cdot [s_R(\lambda) - s_H(\lambda)] - R_R(\lambda)[s_R(\lambda) - s_s(\lambda)]}$$

The system may comprise a memory, wherein, either, said processor or processors is configured to obtain from said memory, values for each of $R_R$, $S_R$, $S_H$ and M, and to evaluate the equation $$R = M \cdot R_R \frac{s_s - s_H}{M \cdot [s_R - s_H] - R_R[s_R - s_s]},$$

or said processor or processors is configured to use said output signal $S_S$ as a look-up to a look-up table stored in said memory, the look-up table being populated with reflectance values evaluated using the equation $$R = M \cdot R_R \frac{s_s - s_H}{M \cdot [s_R - s_H] - R_R[s_R - s_s]}$$

and values for each of $R_R$, $S_R$, $S_H$ and M.

The present invention may be applicable to, for example, proximity sensors, colour sensors, and miniaturized spectrometers. A particular use of the invention relates to the calculation of the target reflectance using and acquired spectral signal and when the target is very close to the light source and detector (h/d small as described below).

DETAILED DESCRIPTION

An approach to measuring the optical, spectral reflectance of a target will now be described and which takes into account the loss of light intensity arising from multiple reflection paths between the emitter and the detector of the system. This novel approach makes use of the assumption that each ray of light, originating from the emitter, is scattered at each reflection into a number M of rays of equal intensity, whilst the reflection reduces the total intensity by a factor equal to the reflectance of the reflecting surface $R(\lambda)$.

For the purpose of illustration, it is assumed that the chassis is metallic and has a reflectance $R_2(\lambda)=1$, whilst the target has a reflectance $R_1(\lambda)=R(\lambda)$. Moreover, upon each reflection from the target and the chassis, the light intensity $I_D$ arriving at the detector will be reduced by the factor M. So, if the total number of reflections between emitter and detector is j, the total effect of the scattering will be to reduce the intensity at the detector by M to the power j, i.e. $M^j$. If it is assumed that N is the number of rays that have the right angle $\theta_n$ to hit the detector and $I_0$ is the light intensity of the emitter, then:

$$I_D = I_0 \cdot \sum_{j=1}^{N} \frac{R(\lambda)^j}{M^j} \tag{2}$$

where:

$$\theta_n = \tan^{-1}\left(\frac{2 \cdot n \cdot h}{d}\right) \tag{3}$$

As a result, the analogue (electrical) signal produced by the detector will be:

$$S_{NM} = k \cdot I_0 \cdot \sum_{j=1}^{N} \frac{R^j}{M^j} + \gamma \tag{4}$$

where k is a multiplicative factor (taking into account the responsivity of the photodetector, potential filter responses and/or interposed media) and $\gamma$ takes into account the amount of diffused light that reaches the detector, the dark counts and the cross-talk.

Figure 2A:
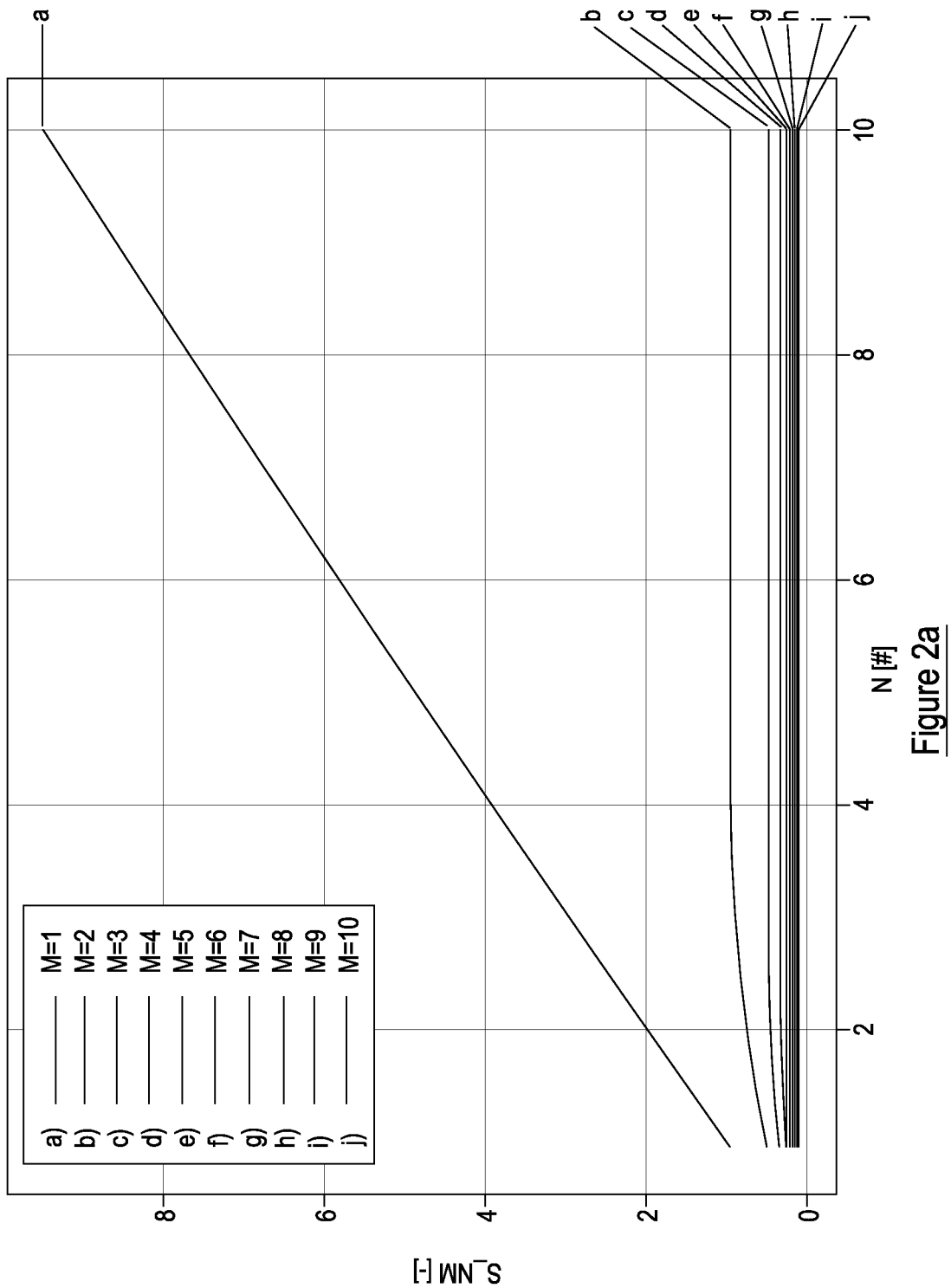
FIG. 2a shows simulated results for an optical reflectance detection system, plotting detected signal S intensity versus a number of rays N having the right angles to hit the detector.
Figure 2B:
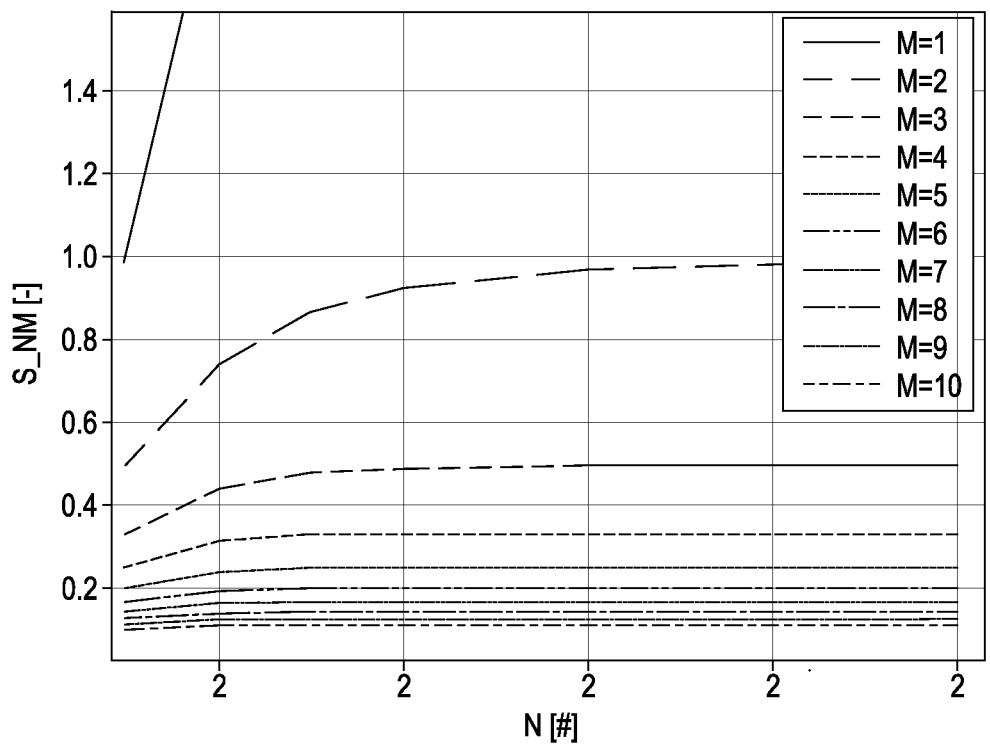
FIG. 2b shows a portion of the results of FIG. 2a with the signal S scale magnified for lower values of S.

FIG. 2a shows simulated data for an optical detection system, illustrating the signal intensity (x-axis) versus the number of rays N having the right angles to hit the detector, for a range of assumed values of M, 1 to 10. FIG. 2b shows the same data but with the x-axis expanded and showing only smaller values of signal intensity (up to 1.6 on the scale). It will be apparent from these figures that the signal intensity tends to saturate for an increasing N. As equation (4) is a geometric series and is convergent (since R/M<1), one may substitute the series with its sum; the sum of the series is already reached for N=6 and M=2. In reality, the amount of allowed rays must be very high (theoretically infinite) and certainly greater than six, meaning:

$$S_{NM} \sim S_{\infty M} = k \cdot I_0 \cdot \frac{R}{M} \frac{1}{1 - \frac{R}{M}} + \gamma \tag{5}$$

Figure 3:
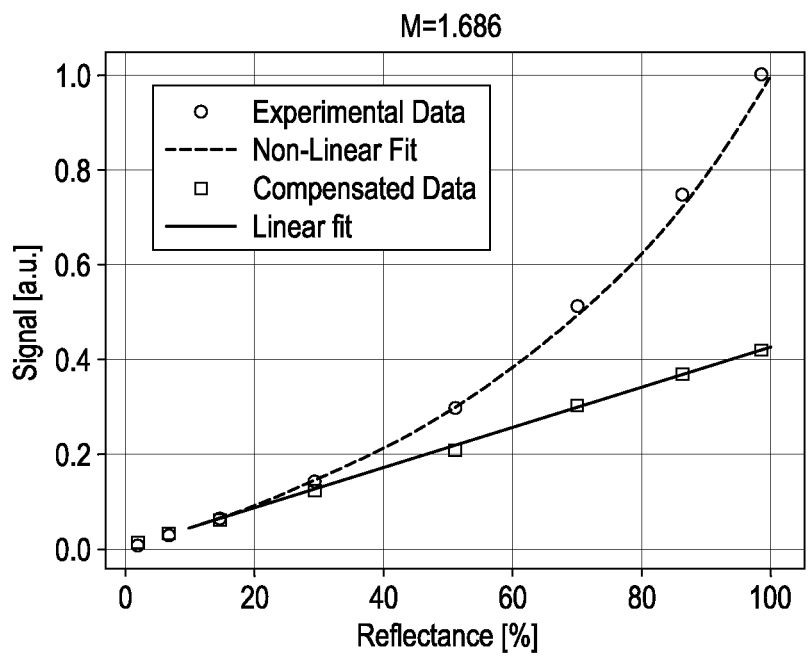
FIG. 3 shows signal intensity versus reflectance characteristics for compensated and an uncompensated detection systems.

The advantage of equation (5) is that is straightforward to compensate for the non-linear effect, by removing the offset $\gamma$ and multiplying the remainder by the factor $(1-R/M)$. This is illustrated by FIG. 3 which shows the normalized integral signal intensity versus (actual) target reflectance where M is assumed to have a value of 1.686, with the upper trace (broken line) showing the uncompensated data and the lower trace (solid line) showing the compensated data.

Considering now the signal in terms of its wavelength response (as is necessary in the case of spectrometers) and relating it to the target reflectance, the commonly used linear formulation is:

$$s(\lambda) = k \cdot I_0(\lambda) \cdot R(\lambda) \tag{6}$$

This assumption of linearity with reflectance of material under test (equation (1)) in such a configuration creates a potential flaw in the calibration algorithm. Using instead the formulation of equation (4), equation (6) becomes:

$$s(\lambda) = k \cdot I_0(\lambda) \cdot \sum_{j=1}^{N} \frac{R^j(\lambda)}{M^j(\lambda)} \tag{7}$$

Replacing the series with the sum in line with equation (5) we get:

$$s(\lambda) = k \cdot I_0(\lambda) \cdot \frac{R(\lambda)}{M(\lambda)} \frac{1}{1 - \frac{R(\lambda)}{M(\lambda)}} \tag{8}$$

This can be reformulated to provide an expression for determining the target reflectance:

$$R(\lambda) = M(\lambda) \cdot R_R(\lambda) \frac{s_s(\lambda) - s_H(\lambda)}{M(\lambda) \cdot [s_R(\lambda) - s_H(\lambda)] - R_R(\lambda)[s_R(\lambda) - s_S(\lambda)]} \tag{9}$$

NB. In equations (6) to (8), $s(\lambda)$ is considered to be only the signal arising from reflectance at the target and includes dark count and cross-talk. By providing calibration, the dark count and cross-talk are removed. In equation (9), $S_H(\lambda)$. corresponds to the offset factor $\gamma$ of equation (5).

Figure 1:
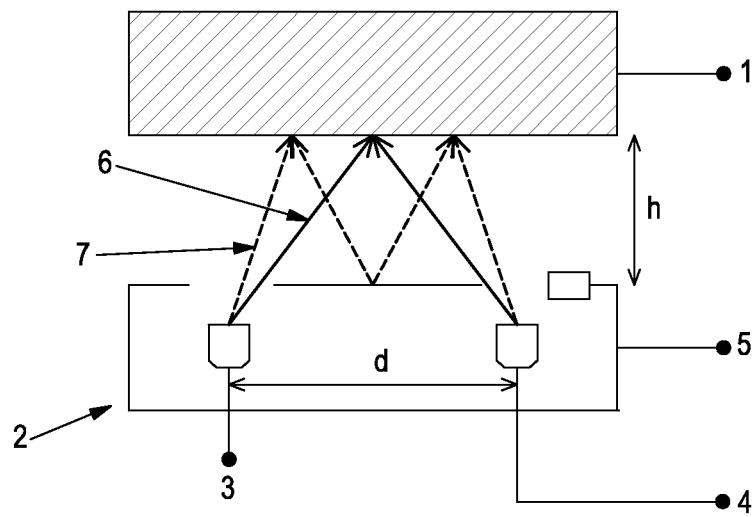
FIG. 1 illustrates schematically an optical reflectance detection system used to measure the reflectance of a target.

The parameter M provides a means to quantify the non-linearity of an optical system such as that illustrated in FIG. 1. The smaller the value of M, the more non-linear the optical system is. If M tends to infinity, the system is linear with reflectance and equation (9) is equal to equation (1). The use of equation (9) linearizes every optical system response. Therefore, by prior calibration in terms of M (and γ), every optical system can be used no matter how "non-linear" a case it represents.

The procedure to compensate the integral signal (integral over the wavelength if coming from a spectrometer) coming from the detector may be described as follows:

1. Acquisition of signals for respective targets with different reflectances.
   a. If the output detector signal is a spectrum, the integral over the wavelengths might be used (to provide an average value of M over the wavelength range).
   b. Alternatively, deduce M for each wavelength.
2. Fit the obtained data pairs [reflectance, detector signal] with equation (5).
3. Extract the parameters γ and M from the fitting (step 2)

It will be appreciated that changing the target height with respect to the detections system (i.e. h in FIG. 1), the optical field changes as the light intensity arriving to the target, as well as the amount of light coming from the multi-paths interaction, will be different. Consequently, a system calibrated with equation (1) will only provide a satisfactory result (subject to the non-linearities produced by multi-path reflections) for a given target height if calibration is performed for that height. If however we perform calibration using equation (5) however, at a target height that is different for the calibration target height, the system will still show a linear behaviour, only on a different M.

This is provided for by equation (9) being dependent upon the target height (variable z);

$$R(\lambda) = M(\lambda, z) \cdot R_R(\lambda) \frac{s(\lambda) - s_H(\lambda)}{M(\lambda, z) \cdot [s_R(\lambda) - s_H(\lambda)] - R_R(\lambda)[s_R(\lambda) - s(\lambda)]} \cdot \eta(z) \quad (10)$$

Where η(z) is the ratio of $S(z_{REF})/S(z)$ (S integral over the wavelength of s(λ)), and $z_{REF}$ is a height of reference.

The procedure for additionally calibrating a system for height is as follows:

4. Repeat steps 1, 2, 3, for different heights in order to obtain M(z) for each height.
5. Obtain the ratio η(z) for each height by measuring S(z)

It will be appreciated that M(z) increases linearly with height until reaching a saturating value. The greater the height of the target above the system, the lower the contribution of multi-paths reflections will be to the detected signal and therefore the higher M will be. On the other hand, η(z) has a non-linear behaviour and it increases with increasing z (approximately according to a second degree polynomial of second grade).

In normal use, the height of the target above the system can be determined using, for example an on-board distance sensor and equation (10) can be used to determine the reflectance of the target, using the values M and η for that height as well as γ which is independent of height.

The approach described above to calibrate a detection system and to calculate reflectance essentially enable every system response to be considered linear with the reflectance. Furthermore, height compensation is easier to apply. The approaches allow for the equalization of output signals provided by multiple sensors located at different positions but still illuminated by the same source. This is an interesting case that is particularly useful when a system includes multiple detectors acting as miniaturized spectrometers, the detectors having overlapping wavelength ranges. As the approaches effectively eliminate the effect of the chassis holding the detector and emitter, optical detection modules can be sold without any restriction on the end use case.

Further advantages achieved by the described approaches may include:

In the case of miniaturized spectrometers, the measured and processed spectra may have much less dispersion from device to device, either sharing the same chassis or using different chassis.

They may improve the measurement precision.

Height compensation may be applied.

Spectra/signals at different heights can be compensated in order to provide consistent results.

The described approaches may be implemented into a system by embedding appropriate algorithms in the software/firmware of those systems, which measure and consequently provide the calculated reflectance of a target. After determining the parameters M(λ) by a priori calibration with reference reflectance targets, they may be stored in a register (memory location), along with the arrays $R_R(\lambda)$, $S_R(\lambda)$, and $S_H(\lambda)$. When a measurement is performed on a target, the raw signals generated by the photodetector, $S_S(\lambda)$, are processed according to equation (9) to provide the target reflectance R(λ). Where height compensation is provided for, and the detection system is capable of measuring the target height (e.g. using a proximity sensor), the parameter η(z) is determined during calibration and stored into the system. The raw signal is then processed according to equation (10). Alternatively the parameter η(z) is determined during calibration and equation (11) is applied to the raw signal. It will nonetheless be appreciated that the processing operations may be distributed, with certain tasks being performed outside of the device within which the detection module is provided.

Figure 4:
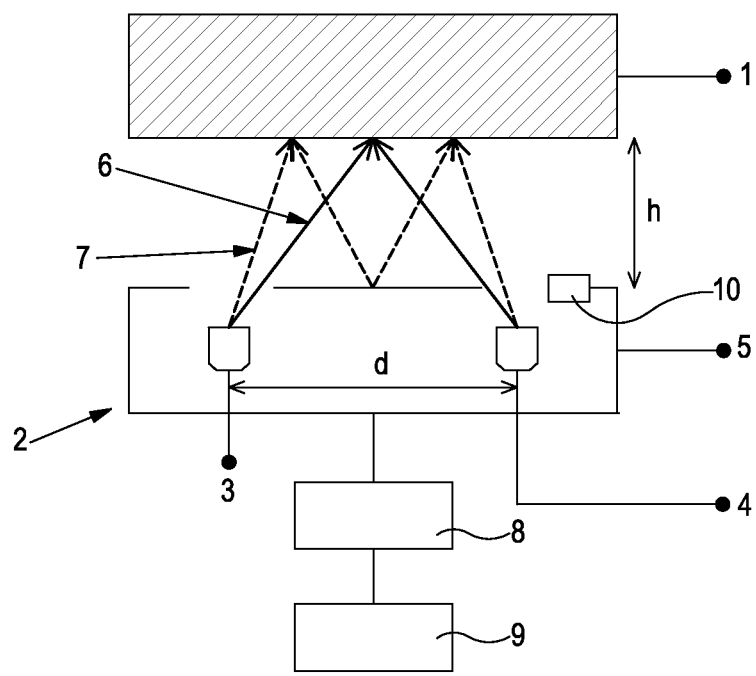
FIG. 4 illustrates schematically a reflectance detection system.

FIG. 4 illustrate an optical reflectance detection system comprising a light emitter 3, light detector 4 and chassis 5. In addition, the system comprises a processor 8 and memory 9, where the processor 8 is configured to operate as discussed above. The memory 9 may store the various parameters required to evaluate equation (9), or equation (10) in which case the system also comprises a proximity sensor 10. Alternatively, the memory 9 may store a pre-calculated look up table mapping sensor output values to reflectances.

Figure 5:
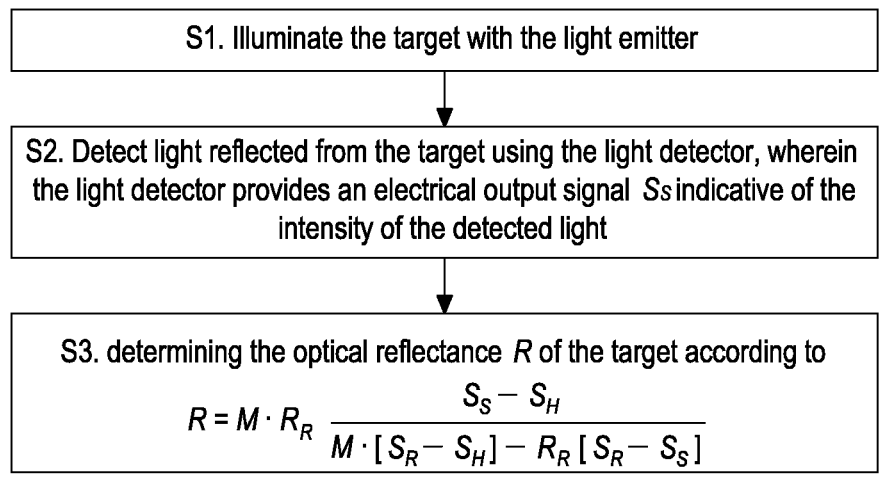
FIG. 5 is a flow diagram illustrating a reflectance detection method.
Figure 6:
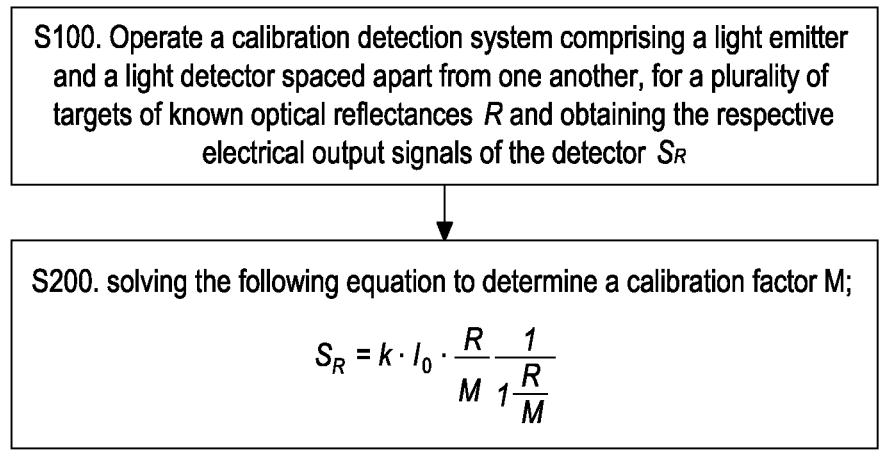
FIG. 6 is a flow diagram illustrating a method of obtaining compensation data for a reflectance detection system.

FIG. 5 describes various steps (S1 to S3) associated with determining a reflectance value for a target, whilst FIG. 6 describes steps (S100 to S200) associated with calibrating the system, either using the system itself to perform the calibration or using a calibration system having the same characteristics.

It will be appreciated that the M(λ) and η(z) parameter calculation may be performed using an on-board computer of the device comprising the reflectance detector, e.g. on a smartphone. Alternatively, raw or pre-processed data may be sent via a network connection to a server or the like at which the parameter calculation is performed, with the calculated parameters being returned to the device where they are stored for later use.

Systems into which the reflectance detector can be integrated include, for example, MEMS-based miniaturized spectrometers, tuneable light sources (UV, visible or infrared).

It will be appreciated by the person of skill in the art that various modifications may be made to the above described embodiments without departing from the scope of the present invention.

Additional Technical Information

To better understand the proposals presented above, reference may be made to the following detailed technical discussion.

Figure 7:
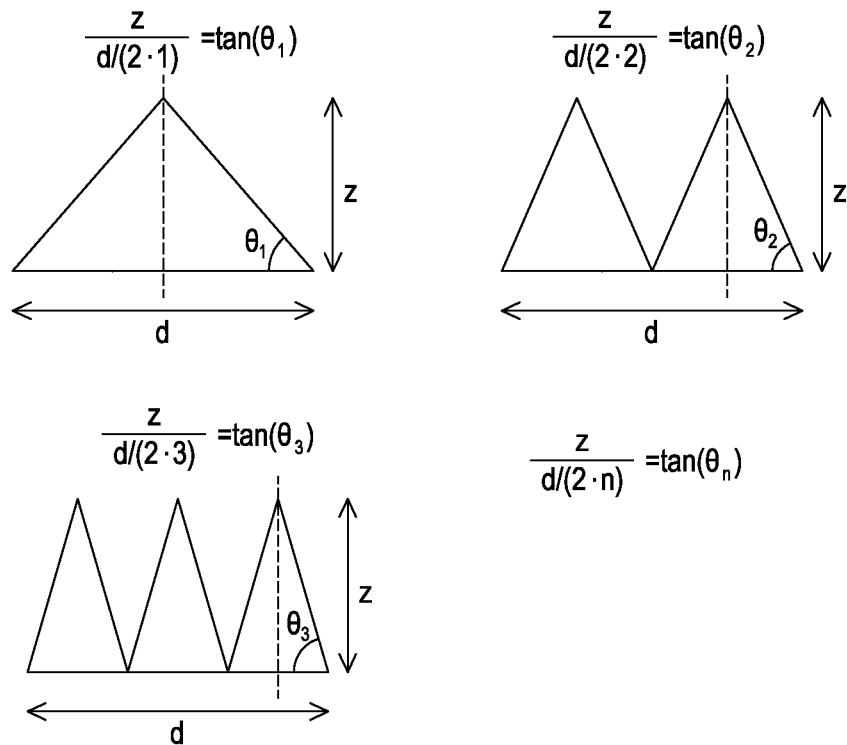
FIG. 7 illustrates schematically a number of accepted modes.

FIG. 7 illustrates certain accepted modes.

I vs $\zeta$

Three main mechanisms are taken into account for studying the behavior of intensity versus the height (or better $\zeta=z/d$). These mechanisms limit the amount of light that reaches the detector (PD) and are:

Maximum number of reflections ($N_M$)
Maximum light path
Minimum acceptance angle
Maximum number of reflections Allowed modes are not infinite. In reality, modes which have a high value of N will undergo a high number of reflections and if their exiting intensity is low, they will not contribute to the signal read by the PD. In other words, for a certain target reflectance R, the maximum number of accepted modes N has a superior limit $N_M$, which is imposed by the detector sensitivity.

Assuming that the PD is only able to read intensities 'I' higher than a certain threshold '$I_0$', a generic mode, in the case of no attenuation through the medium the following inequality must hold:

$$I = I_S \cdot \left(\frac{R}{M}\right)^N \geq I_0 \rightarrow N \leq \left\lfloor \frac{\ln\left(\frac{I_0}{I_S}\right)}{\ln\left(\frac{R}{M}\right)} \right\rfloor = N_M \quad (11)$$

This relationship is important, because it relates the PD sensitivity $I_0$, the emitted intensity from the illuminating source $I_S$, the target reflectance R, and the parameter M. The function $\lfloor \; \rfloor$ represents the floor function.

Maximum Light path ($\theta_{max}$)

We assume that an optical ray cannot travel longer than a certain distance, because of attenuation through the medium. Therefore, although the number of reflections that it must undergo is equal or lower than $N_M$, that mode does not reach the PD if the optical path is longer than a certain limit.

Figure 8A:
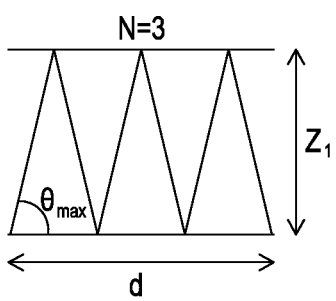
FIG. 8 illustrates a simplified maximum light path scheme.
Figure 8B:
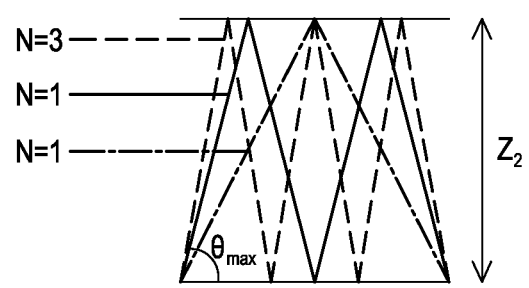

Let us suppose that FIG. 8a depicts the situation in which a ray has reached the maximum light path (at $z_1$, $\theta_{max}$). If the height is increased to $z_2$ (FIG. 8b), and we keep the same angle $\theta_{max}$ (N=3), light has to travel a longer path, therefore the same mode or higher is not allowed. Only inferior modes (N1, N2) may reach up to the PD, if the light path is shorter than the limit.

The longest path sets a limiting angle $\theta_{max}$ at a certain elevation, beyond which light will not reach the PD.

$$I_0 = I_S \cdot \left(\frac{R}{M}\right)^N \cdot e^{-\alpha \cdot r_{max}} \quad (12)$$

$$r_{max} = \frac{z}{sen(\theta_{max})} 2N \quad (13)$$

Substituting (13) in (12):

$$\ln\left(\frac{I_0}{I_S}\right) = N \cdot \ln\left(\frac{R}{M}\right) - \alpha \cdot r_{max} = N \cdot \ln\left(\frac{R}{M}\right) - \frac{\alpha \cdot z}{sen(\theta_{max})} 2N \quad (14)$$

$$sen(\theta_{max}) = \frac{2\alpha \cdot z \cdot N}{N \cdot \ln\left(\frac{R}{M}\right) - \ln\left(\frac{I_0}{I_S}\right)} \quad (15)$$

In equation (15), the medium is also taken into account by the attenuation coefficient $\alpha$, $N \leq N_M$.

$\theta_{min}$

Figure 9:
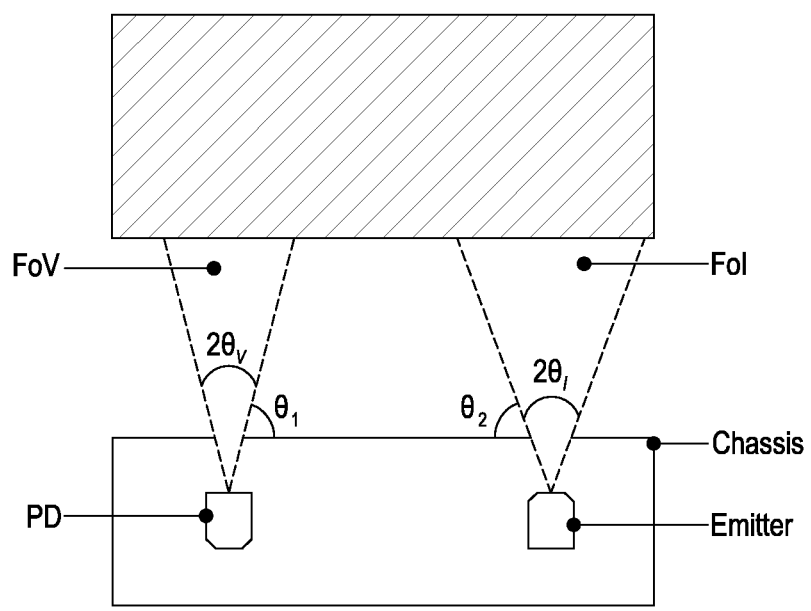
FIG. 9 illustrates the FoI and FoV for a simplified reflectance detection system.

FIG. 9 illustrates FoI and FoV simplified scheme. Because of the characteristic field of view (FoV) of the PD and the field of illumination (FoI) of the emitter, there is a minimum angle $\theta_{min}$, below which light cannot exit from the illuminator or enter to the PD. Although modes below such a limit would be allowed, the PD will read no power. Referring to FIG. 8, $$\theta_{min} = \max\{\theta_1, \theta_2\} = \left\{\frac{\pi}{2} - \theta_V, \frac{\pi}{2} - \theta_I\right\} \quad (16)$$

Effective Modes ($N_{max}$–$N_{min}$)

The three limiting mechanisms provide the number of possible modes for specific system settings ($I_0$, $I_S$, R, M, $\alpha$, FoI, FoV, $\zeta$), $N_{max}$–$N_{min}$. The amount of rays will clearly determine the amount of light sensed by the PD. By plotting the expression:

$$\theta_n = \tan^{-1}(2\zeta n) \quad (17)$$

it is possible to easily interpret how the limiting factors determine $N_{max}$–$N_{min}$, which are given by the interceptions with the lines $\theta=\theta_{max}$ and $\theta=\theta_{min}$ and the curve $\theta_n(\zeta)$. By increasing $\zeta$ the curves move towards the y-axis becoming steeper, the modes below $\theta_{max}$ are more concentrated toward 90°, so $N_{max}$ is smaller.

By decreasing $\zeta$, the difference $N_{max}$–$N_{min}$ increases, as does the intensity. The maximum intensity is reached when $\zeta$ is equal to $\zeta_T$. Below this value, the intensity decreases again because $N_M$ is reached by angles that are smaller than $\theta_{max}$. At the same time, $N_{min}$ (minimum angle, from which the optical ray reaches the PD) increases, the difference $N_{max}$–$N_{min}$ decreases. The intensity will reach its minimum value when $\zeta=\zeta_0$.

From eq. (16) we can deduce the values of $\tan(\theta_{max})$, $\tan(\theta_{min})$ by substituting $N_M$ to n, and $\zeta_T$, $\zeta_0$ to $\zeta$, respectively.

$$\tan(\theta_{max}) = 2\zeta_T N_M \quad (18)$$

$$\tan(\theta_{min}) = 2\zeta_0 N_M \quad (19)$$

It is clear that the number of rays is limited and it is no longer legitimate to use the sum from 1 to $\infty$, but rather from $N_{min}$ to $N_{max}$. For simplicity, the attenuation of each ray is excluded. It is only considered that modes beyond $\theta_{max}$ are excluded.

$$\sum_{j=N_{min}}^{N_{max}} \left(\frac{R}{M}\right)^j = \sum_{j=0}^{N_{max}} \left(\frac{R}{M}\right)^j - \sum_{j=0}^{N_{min}-1} \left(\frac{R}{M}\right)^j \quad (20)$$

sums of the first $N_{max}$ and $N_{min}$–1 terms of a geometric series are:

$$\sum_{j=0}^{N_{max}} \left(\frac{R}{M}\right)^j = \frac{1 - \left(\frac{R}{M}\right)^{N_{max}+1}}{1 - \left(\frac{R}{M}\right)} \quad (21)$$

-continued $$\sum_{j=0}^{N_{min}-1}\left(\frac{R}{M}\right)^j = \frac{1-\left(\frac{R}{M}\right)^{N_{min}}}{1-\left(\frac{R}{M}\right)} \quad (22)$$

$$\sum_{j=N_{min}}^{N_{max}}\left(\frac{R}{M}\right)^j = \frac{\frac{R}{M}}{1-\left(\frac{R}{M}\right)}\left[\left(\frac{R}{M}\right)^{N_{min}-1} - \left(\frac{R}{M}\right)^{N_{max}}\right] \quad (23)$$

(Please note $M$ does not change with $\zeta$).

$$\sum_{j=N_{min}}^{N_{max}}\left(\frac{R}{M}\right)^j = \frac{\frac{R}{M}}{1-\left(\frac{R}{M}\right)}\left[\left(\frac{R}{M}\right)^{\left\lfloor\frac{tan(\theta_{min})}{2\zeta}\right\rfloor-1} - \left(\frac{R}{M}\right)^{\left\lfloor\frac{tan(\theta_{max})}{2\zeta}\right\rfloor}\right] \quad (24)$$

Therefore, what it is really changing with $\zeta$ is the weight of the following factor on the rest of the function.

$$\left(\frac{R}{M}\right)^{N_{min}-1} - \left(\frac{R}{M}\right)^{N_{max}} = \quad (25)$$

$$\left(\frac{R}{M}\right)^{\left\lfloor\frac{tan(\theta_{min})}{2\zeta}\right\rfloor-1} - \left(\frac{R}{M}\right)^{\left\lfloor\frac{tan(\theta_{max})}{2\zeta}\right\rfloor} = \left(\frac{R}{M}\right)^{\left\lfloor\frac{\zeta_0}{\zeta}\right\rfloor N_M - 1} - \left(\frac{R}{M}\right)^{\left\lfloor\frac{\zeta_T}{\zeta}\right\rfloor N_M}$$

The higher the $\zeta$ the lower the modes. At higher elevations, the curve intensity versus reflectance becomes linear for a certain range, when theoretically only one ray is allowed to hit the PD. On the contrary, when $\zeta$ is low the number of modes increases and the terms $$\left(\frac{R}{M}\right)^n$$

become very small.

As already explained, below $\zeta_T$, the intensity decreases (verified experimentally) because no higher modes than $N_M$ are allowed and either the emitter or the PD have a field of illumination (FoI) and a field of view (FoV) respectively. When $\zeta=\zeta_0$ the intensity approaches zero. Both $\zeta_T$ and $\zeta_0$ depends on R/M as expected.

Experimental results demonstrate that the model under the conditions described holds well.

The invention claimed is:

1. A method of measuring an optical reflectance R of a target using a detection system comprising a light emitter and a light detector spaced apart from one another, the method comprising:
   illuminating the target with the light emitter;
   detecting light reflected from the target using the light detector, wherein the light detector provides an electrical output signal $S_S$ indicative of the intensity of the detected light; and
   determining the optical reflectance R of the target according to $$R = M \cdot R_R \frac{S_S - S_H}{M \cdot [S_R - S_H] - R_R[S_R - S_S]},$$

where
   $R_R$ is the spectral reflectance of a reference standard,
   $S_R$ is the detector electrical output signal with the reference standard in place,
   $S_H$ is the detector electrical output signal with no target in front of the light emitter and light detector, and
   M is a calibration factor.

2. The method according to claim 1 and comprising:
   determining a height z of the target above the detection system;
   using said height z to determine a height scaling factor $\eta(z)$;
   scaling the determined reflectance using the scaling factor according to $$R = M \cdot R_R \frac{S_S - S_H}{M \cdot [S_R - S_H] - R_R[S_R - S_S]} \cdot \eta(z).$$

3. The method according to claim 1, wherein said reflectance R is measured for one or more wavelengths $\lambda$, according to:

$$R(\lambda) = M(\lambda) \cdot R_R(\lambda) \frac{S_S(\lambda) - S_H(\lambda)}{M(\lambda) \cdot [S_R(\lambda) - S_H(\lambda)] - R_R(\lambda)[S_R(\lambda) - S_S(\lambda)]}.$$

4. The method according to claim 1, wherein said electrical output signals are integrated over a wavelength range, and said reflectances represent reflectances averaged over the wavelength range.

5. The method according to claim 1, said step of determining the optical reflectance R of the target comprising obtaining from a memory values for each of $R_R$, $S_R$, $S_H$ and M, and evaluating the equation $$R = M \cdot R_R \frac{S_S - S_H}{M \cdot [S_R - S_H] - R_R[S_R - S_S]}.$$

6. The method according to claim 1, wherein said step of determining the optical reflectance R of the target comprises using said output signal $S_S$ as a look-up to a look-up table, the look-up table being populated with reflectance values evaluated using the equation $$R = M \cdot R_R \frac{S_S - S_H}{M \cdot [S_R - S_H] - R_R[S_R - S_S]}$$

and values for each of $R_R$, $S_R$, $S_H$ and M.

7. The method according to claim 1, wherein the calibration factor M is dependent upon a target material type.

8. A method of obtaining calibration data for the detection system configured to use the method of claim 1 to measure optical reflectance, the method comprising:
   operating a calibration detection system comprising a light emitter and a light detector spaced apart from one another, for a plurality of targets of known optical reflectances R and obtaining the respective electrical output signals of the detector $S_R$; and
   solving the following equation to determine a calibration factor M;

$$S_R = k \cdot I_0 \cdot \frac{R}{M} \frac{1}{1 - \frac{R}{M}},$$

where k is a multiplicative factor taking into account the responsivity of the photodetector, potential filter responses and/or interposed media, where $I_0$ is the light intensity of the light emitter.

9. The method according to claim 8, wherein:

said calibration detection system is the detection system for which calibration data is being obtained, or said calibration detection system is a different system from the detection system for which calibration data is being obtained and the method comprises providing the calibration factor M to the detection system for which calibration data is being obtained.

10. The method according to claim 8, wherein the detection system for which calibration data is being obtained is configured to measure said reflectance R for one or more wavelengths λ, according to:

$$R(\lambda) = M(\lambda) \cdot R_R(\lambda) \frac{S_S(\lambda) - S_H(\lambda)}{M(\lambda) \cdot [S_R(\lambda) - S_H(\lambda)] - R_R(\lambda)[(S_R(\lambda) - S_S(\lambda)]},$$

the method comprising performing the steps of operating and solving for one or more wavelengths, and determining a value of M(λ) for each wavelength.

11. The method according to claim 8, wherein the detection system is configured to:

determine a height z of the target above the detection system;

use said height z to determine a height scaling factor η(z);

scale the determined reflectance using the scaling factor according to $$R = M \cdot R_R \frac{S_S - S_H}{M \cdot [S_R - S_H] - R_R[S_R - S_S]} \cdot \eta(z),$$

and comprising repeating the steps of operating and solving, for a plurality of different heights z above the calibration detection system, to determine values of M and η(z) for respective heights.

12. An optical reflectance measurement system comprising a chassis and, mounted to the chassis, a light emitter and a light detector, the system further comprising a processor or processors configured to:

cause the light emitter to illuminate the target;

cause the light detector to detect light reflected from the target, wherein the light detector provides an electrical output signal $S_S$ indicative of the intensity of the detected light; and determine an optical reflectance R of the target according to $$R = M \cdot R_R \frac{S_S - S_H}{M \cdot [S_R - S_H] - R_R[S_R - S_S]},$$

where $R_R$ is the spectral reflectance of a reference standard, $S_R$ is the detector electrical output signal with the reference standard in place, $S_H$ is the detector electrical output signal with no target in front of the light emitter and light detector, and M is a calibration factor.

13. The optical reflectance measurement system according to claim 12 and comprising a proximity sensor for determining a height z of the target above the detection system, said processor or processors configured to:

use said height z to determine a height scaling factor η(z);

scale the determined reflectance using the scaling factor according to $$R = M \cdot R_R \frac{S_S - S_H}{M \cdot [S_R - S_H] - R_R[S_R - S_S]} \cdot \eta(z).$$

14. The optical reflectance measurement system according to claim 12, said processor or processors configured to determine said reflectance R for one or more wavelengths λ, according to:

$$R(\lambda) = M(\lambda) \cdot R_R(\lambda) \frac{S_S(\lambda) - S_H(\lambda)}{M(\lambda) \cdot [S_R(\lambda) - S_H(\lambda)] - R_R(\lambda)[S_R(\lambda) - S_S(\lambda)]}.$$

15. The optical reflectance measurement system according to claim 12 and comprising a memory, wherein, either, said processor or processors is configured to obtain from said memory, values for each of $R_R$, $S_R$, $S_H$ and M, and to evaluate the equation $$R = M \cdot R_R \frac{S_S - S_H}{M \cdot [S_R - S_H] - R_R[S_R - S_S]},$$

or said processor or processors is configured to use said output signal $S_S$ as a look-up to a look-up table stored in said memory, the look-up table being populated with reflectance values evaluated using the equation $$R = M \cdot R_R \frac{S_S - S_H}{M \cdot [S_R - S_H] - R_R[S_R - S_S]}$$

and values for each $R_R$, $S_R$, $S_H$ and M.

* * * * *